US012718012B2

(12) United States Patent
Luo

(10) Patent No.: US 12,718,012 B2
(45) Date of Patent: Aug. 25, 2026

(54) MESSAGE DISPLAY METHOD AND ELECTRONIC DEVICE

(71) Applicant: VIVO MOBILE COMMUNICATION CO., LTD., Dongguan (CN)

(72) Inventor: Hongxing Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 401 days.

(21) Appl. No.: 18/096,202

(22) Filed: Jan. 12, 2023

(65) Prior Publication Data

US 2023/0153520 A1 May 18, 2023

Related U.S. Application Data

(63) Continuation of application No. PCT/CN2021/106214, filed on Jul. 14, 2021.

(30) Foreign Application Priority Data

Jul. 14, 2020 (CN) ........................ 202010674303.7

(51) Int. Cl.
*G06F 40/205* (2020.01)
*G06F 40/169* (2020.01)

(52) U.S. Cl.
CPC .......... *G06F 40/205* (2020.01); *G06F 40/169* (2020.01)

(58) Field of Classification Search
CPC ........ G06F 16/35; G06F 16/34; G06F 40/169; G06F 16/345; G06F 40/134; G06F 16/374; G06F 40/205; H04L 51/216; H04L 51/222
See application file for complete search history.

(56) References Cited

U.S. PATENT DOCUMENTS

| | | | | |
|---|---|---|---|---|
| 7,443,283 | B2 * | 10/2008 | Schmandt | H04L 67/52 340/407.1 |
| 7,702,611 | B2 * | 4/2010 | Chi | G06F 40/169 707/999.001 |
| 8,504,550 | B2 * | 8/2013 | Hall | G06F 16/35 707/771 |
| 8,638,301 | B2 * | 1/2014 | Birnbaum | G06F 3/04886 345/173 |
| 9,544,257 | B2 * | 1/2017 | Ogundokun | H04L 12/1822 |
| 11,023,200 | B2 * | 6/2021 | Sarir | G08B 5/38 |
| 12,400,014 | B1 * | 8/2025 | Whyte | G06F 21/6218 |
| 12,401,680 | B1 * | 8/2025 | Sharma | H04L 63/1433 |
| 2006/0156222 | A1 * | 7/2006 | Chi | G06F 40/247 707/E17.058 |

(Continued)

FOREIGN PATENT DOCUMENTS

| | | |
|---|---|---|
| CN | 105872213 A | 8/2016 |
| CN | 107453986 A | 12/2017 |

(Continued)

*Primary Examiner* — Richemond Dorvil

(74) *Attorney, Agent, or Firm* — The Webb Law Firm

(57) ABSTRACT

A message display method includes: in a case of receiving a target message, parsing the target message to obtain text content of the target message; extracting key information of the target message based on the text content; associating the key information with the target message to obtain a first target association message; and displaying the first target association message.

12 Claims, 7 Drawing Sheets

(56) References Cited

U.S. PATENT DOCUMENTS

2007/0162550 A1* 7/2007 Rosenberg .............. H04L 51/04 709/206
2012/0330658 A1 12/2012 Bonforte
2013/0006973 A1* 1/2013 Caldwell ............... G06F 16/345 707/723
2013/0090918 A1* 4/2013 Lee ......................... G06F 16/35 704/9
2015/0089673 A1* 3/2015 Beckman ............ G06F 21/6218 726/29
2015/0227620 A1* 8/2015 Takeuchi .............. G06F 40/242 707/740
2015/0288633 A1 10/2015 Ogundokun et al.
2016/0301639 A1 10/2016 Liu et al.
2017/0118152 A1* 4/2017 Lee ....................... G06F 16/345
2017/0353408 A1 12/2017 Chen
2018/0218076 A1* 8/2018 Liu ..................... G06F 16/9574
2023/0153520 A1* 5/2023 Luo ....................... G06F 40/169 704/9
2025/0254370 A1* 8/2025 Stetson .................. G09B 23/28

FOREIGN PATENT DOCUMENTS

CN 108572764 A 9/2018
CN 110099360 A 8/2019
CN 110674634 A 1/2020
CN 110958286 A 4/2020
CN 111128185 A 5/2020
CN 111243580 A 6/2020
CN 111859900 A 10/2020

* cited by examiner

700

ELECTRONIC DEVICE

702

Memory

701

Processor

MESSAGE DISPLAY METHOD AND ELECTRONIC DEVICE

CROSS-REFERENCE TO RELATED APPLICATIONS

This application is a Bypass Continuation Application of PCT/CN2021/106214 filed Jul. 14, 2021, and claims priority to Chinese Patent Application No. 202010674303.7 filed Jul. 14, 2020, the disclosures of which are hereby incorporated by reference in their entireties.

BACKGROUND OF THE INVENTION

Field of the Invention

This application pertains to the field of communications technologies, and in particular, to a message display method, apparatus, and an electronic device.

Description of Related Art

In the current social software, it is very popular to use non-verbal messages such as voice messages for communication. Compared with traditional text messages, the voice messages can avoid spending a long time in inputting a long string of words. In this way, it is very convenient for users to communicate, and communication content of the user can also be expressed quickly and accurately.

SUMMARY OF THE INVENTION

According to a first aspect, an embodiment of this application provides a message display method, including:

- in a case of receiving a target message, parsing the target message to obtain text content of the target message;
- extracting key information of the target message based on the text content;
- associating the key information with the target message to obtain a first target association message; and
- displaying the first target association message.

According to a second aspect, an embodiment of this application provides a message display apparatus, including:

- a parsing module, configured to: in a case of receiving a target message, parse the target message to obtain text content of the target message;
- an extraction module, configured to extract key information of the target message based on the text content;
- a first association module, configured to associate the key information with the target message to obtain a first target association message; and
- a first display module, configured to display the first target association message.

According to a third aspect, an embodiment of this application provides an electronic device, where the electronic device includes a processor, a memory, and a program or an instruction stored in the memory and executable on the processor, and when the program or the instruction is executed by the processor, steps of the method according to the first aspect are implemented.

According to a fourth aspect, an embodiment of this application provides a non-transitory computer-readable storage medium, where the non-transitory computer-readable storage medium stores a program or an instruction, and when the program or the instruction is executed by a processor, steps of the method according to the first aspect are implemented.

According to a fifth aspect, an embodiment of this application provides a chip, where the chip includes a processor and a communications interface, the communications interface is coupled to the processor, and the processor is configured to execute a program or an instruction, to implement the method according to the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that terms used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and a character "I" generally represents an "or" relationship between associated objects.

With reference to the accompanying drawings, the following describes the message display method in the embodiments of this application based on embodiments and application scenarios thereof.

At present, although the voice message provides users with great convenience, the users cannot get any content of the voice message unless they click it to listen. Thus, the existing message display mode has a poor content presentation effect.

Figure 1:
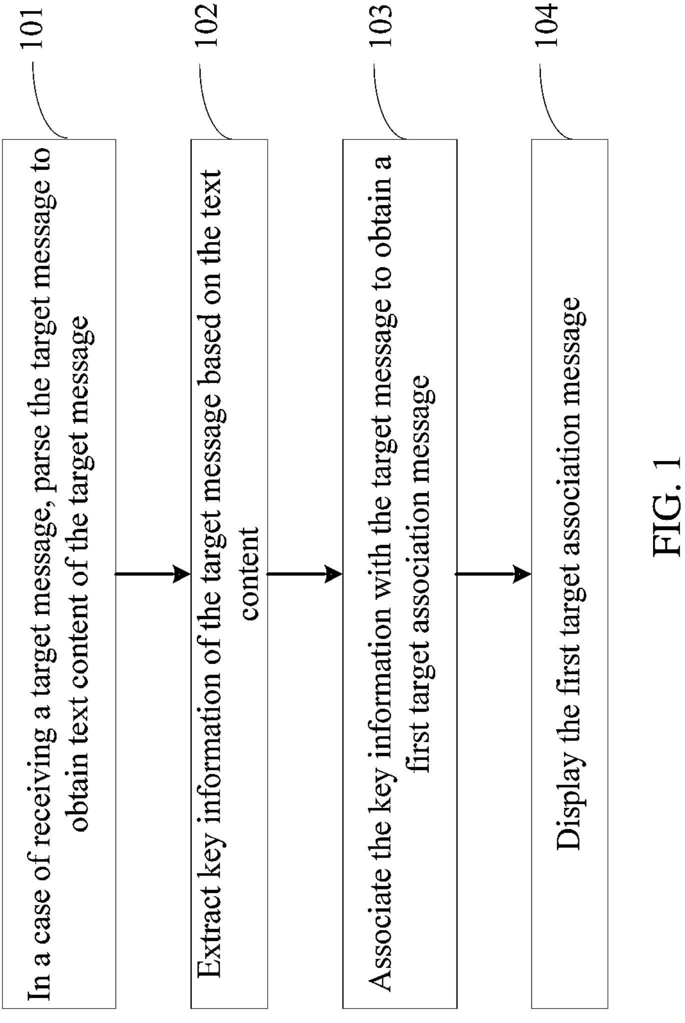
FIG. 1 is a flowchart of a message display method according to an embodiment of this application.

Referring to FIG. 1, FIG. 1 is a flowchart of a message display method according to an embodiment of this application. As shown in FIG. 1, the method includes the following steps.

Step 101. In a case of receiving a target message, parse the target message to obtain text content of the target message.

In this step, the target message may be a voice message, a picture message, a document message, or the like.

The parsing mode of the target message may vary with the type of the target message. When the target message is a voice message, the voice message may be converted to text, to obtain text content of the target message. When the target message is a picture message, image processing may be performed on the picture in the picture message, so as to obtain text content characterizing the picture. When the target message is a document message, document content in the document message may be extracted at a terminal or an offline backend, and the document content is summarized semantically to obtain text content characterizing the document. In the following embodiment, the target message will be described by taking the voice message as an example.

The target message may be a voice message in a chat interface, and when the voice message is received in the chat interface, a voice annotation function may be triggered, and the voice annotation function is used to mark key information of the voice message on the voice message, so as to automatically present the key information of the voice message. Accordingly, the voice message is converted to text, so as to obtain the text content of the voice message.

Step 102. Extract key information of the target message based on the text content.

In this step, the key information of the target message may include at least one of:

keywords characterizing the target message;

a scenario identifier of the target scenario to which the target message belongs; or association information, such as an association link, which is used to link the target message to the target history message.

Certainly, other information may also be included, which will not be listed herein.

In an optional implementation, the extracting key information of the target message based on the text content may include:

extracting M keywords from the text content, where M is a positive integer.

In this implementation, the key information of the target message may include only the M keywords of the target message, and when the M keywords of the text content are extracted, keywords such as time, place, people, and events in the text content are mainly extracted.

For example, there is a voice message in a chat group of a user, that is, "Let's have a dinner party after work at six o'clock". After the keywords of the text content of the voice message are extracted, the keywords characterizing the voice message are "six o'clock", "after work", and "have a dinner party". In order to simplify the display of the voice message in the chat interface, no more than 5 keywords can be displayed with the voice message.

The key information of the target message may include both the M keywords of the target message and a scenario identifier of the target scenario to which the target message belongs. Certainly, the key information of the target message may also include only the scenario identifier of the target scenario.

In another optional implementation, the extracting key information of the target message based on the text content includes:

extracting M keywords from the text content, where M is a positive integer;

matching the M keywords with vocabulary libraries under a plurality of preset scenarios, where each keyword has a matching relationship with a vocabulary library under at most one of the preset scenarios; and in a case of being matched successfully, determining a target scenario to which the target message belongs from at least one successfully matched preset scenario, where the key information includes the M keywords and a scenario identifier of the target scenario.

In this implementation, the key information of the target message may include both the M keywords of the target message and a scenario identifier of the target scenario.

For example, the M keywords of the text content may be extracted first, and then the target scenario to which the target message belongs is determined based on the M keywords.

For example, scenarios to which voice messages belong may be divided into the following categories:

Work scenario: usually includes common keywords such as attendance, punch in, salary, report, meeting, and the like.

Learning scenario: usually includes keywords such as grades, homework, exams, courses, and the like.

Life scenario: usually includes entertainment, shopping, parties, clothing, food, housing and other aspects of the keywords.

Each scenario is corresponding to a vocabulary library, which includes a large number of keywords that characterize the scenario. For example, a vocabulary library under the work scenario may usually include keywords such as salary, report, attendance, meeting, and the like. Keywords in a vocabulary library under one scenario are disjoint from vocabulary libraries under other scenarios, and thus, it can be ensured that each of the M keywords can only have a matching relationship with a vocabulary library under at most one scenario.

The M keywords of the target message are matched with vocabulary libraries under a plurality of preset scenarios respectively, and the target scenario to which the target message belongs is determined based on a matching result. There may be three cases of the matching result. In a first case, the keywords of the target message are matched in only one preset scenario. For example, the keywords of the voice message are "six o'clock", "after work", and "have a dinner party", these keywords are used to match vocabulary libraries under a plurality of preset scenarios respectively, the keyword "have a dinner party" is matched in the vocabulary library under the life scenario only, and the foregoing three keywords are not totally matched in vocabulary libraries under other scenarios. Therefore, it can be determined that the target scenario to which the voice message belongs is the life scenario.

In a second case, if the keywords of the target message are not matched in the vocabulary libraries under the plurality of preset scenarios, it may be determined that there is no scenario for the target message, that is, none of the preset scenarios can characterize the target message.

In a third case, the keywords of the target message are matched in vocabulary libraries under at least two scenarios in the vocabulary libraries under the plurality of preset scenarios. In this case, the target scenario to which the target message belongs is a scenario with a higher matching degree. The matching degree may be characterized by the number of keywords matched in the vocabulary library under the scenario. For example, there are 5 keywords of the target message, and three keywords are matched in the vocabulary library under the life scenario, while two keywords are matched in the vocabulary library under the work scenario. In this case, the keywords of the target message have a higher matching degree with the life scenario, and the target scenario to which the target message belongs is the life scenario.

In addition to the keywords of the target message and the scenario identifier of the target scenario, the key information of the target message may also include the association information of the target message. Certainly, the key information of the target message may also include the association information of the target message only. The association information is used to link the target message to the target history message.

In another optional implementation, the extracting key information of the target message based on the text content further includes:

- if there is a target history message in a preset time period before the target message, determining whether there is an association relationship between the target message and the target history message, where a scenario to which the target history message belongs is the same as the target scenario; and
- if there is an association relationship between the target message and the target history message, associating the target message with the target history message to obtain association information of the target message, where the association information is used to link the target message to the target history message, and the key information includes the association information.

In this implementation, the key information of the target message includes keywords, a scenario identifier of the target scenario, and association information.

For example, it is determined whether the chat interface includes a history message of the target message. The history message may be an unread voice message before the target message. If the history message is included, it is determined whether the target history message is included in the preset time period before the target message, where a scenario to which the target history message belongs is the same as the target scenario to which the target message belongs. The preset time period may be set as required, which may be described below.

If the target history message is included in the preset time period before the target message, it is determined whether there is an association relationship between the target message and the target history message, and if there is the association relationship, the target message is associated with the target history message to obtain the association information of the target message. The association information may be an association link, and the target message may be linked to the associated target history message based on the association link.

When it is determined that the target message and the target history message satisfy one of the following conditions, it may be determined that the target message has an association relationship with the target history message:

- a sender of the target message is the same as a sender of the target history message; or
- a similarity between the keywords of the target message and the keywords of the target history message is greater than a preset threshold.

For example, if a voice message in the chat interface is the first voice message in the latest period of time (such as 10 minutes), that is, there is no history message in the 10 minutes before the voice message, or although there is a history message before the voice message, the scenario to which the history message belongs is different from the scenario to which the voice message belongs, and it may be determined that there is no history message associated with the voice message. The voice message may be marked as a first label characterizing a single voice message.

For another example, if one or more target history messages are included in the chat interface before the voice message, the keywords of the voice message may be compared with keywords of each target history message to calculate the similarity between the keywords of the voice message and the keywords of the target history message. If the similarity is greater than the preset threshold, namely, 60%, it is considered that there is an association relationship between the two voice messages, and the two voice messages characterize a same event. If the voice message has an association relationship with the previous voice message, the voice message may be marked as a second tag characterizing an association voice message.

In a case of calculating the similarity, if a keyword list of the voice message (the keyword list includes the M keywords of the voice message) and a keyword list of the target history message have same or similar keywords, or there is associative extension in keyword semantics thereof, it may be determined that the similarity of the two voice messages is greater than the preset threshold, and there is an association relationship between the two voice messages.

If there are a plurality of target history messages before the voice message in the chat interface, and all these target history messages are associated with the voice message, the voice message may be associated with the target history message with the highest similarity. For similarity calculation between the voice message and the target history message, reference may be made to matching degree calculation of the scenario. That is, the more same or similar keywords exist in the keyword list of the voice message (the keyword list includes a plurality of keywords of the voice message) and the keyword list of the target history message, or the easier there is associative extension in keyword semantics thereof, the higher the similarity thereof is. Certainly, if there are a plurality of target history messages before the voice message in the chat interface, and all these target history messages are associated with the voice message, the voice message may also be associated with a latest target history message.

For another example, if there is a target history message in the preset time period before a voice message in the chat interface, such as 3 minutes, and the two voice messages are sent by a same sender, it may also be determined that there is an association relationship between the two voice messages.

Step 103. Associate the key information with the target message to obtain a first target association message.

In this step, the key information may be associated with the target message to establish an association relationship between the key information and the target message and obtain the first target association message, where the first target association message includes the target message and the key information.

Step 104. Display the first target association message.

In this step, the key information may be displayed with the target message in the form of annotation, that is, the target message and the annotation characterizing the key information may be simultaneously displayed at a corresponding position of the chat interface, and a display position of the annotation characterizing the key information is corresponding to the display position of the target message.

For example, various annotations may be added to the target message based on the key information, including but not limited to text annotations, highlighting (including highlighting with background color), icons, patterns, and various common symbols.

For example, keywords of the target message may be displayed in the form of text annotation with the target message. For another example, the target scenario to which the target message belongs may be highlighted in the background color on the text annotation, and different target scenarios have different background colors. The display of the association information will be described in the following embodiments.

In this embodiment, in a case of receiving a target message, the target message is parsed to obtain text content of the target message; key information of the target message is extracted based on the text content; the key information is associated with the target message to obtain a first target association message; and the first target association message is displayed. In this way, when the target message is displayed, the key information of the target message may be displayed with the target message, so that the key information in the target message may be obtained by the user without any operation to the target message. In this way, the content presentation effect of the target message can be improved.

In addition, as for the scenario in which the chat interface includes a plurality of voice messages, for example, a chat group of a user is very active. When the user has not checked the group chat for a period of time, the chat interface of the group will be filled with a large number of unread voice messages. If the user doesn't click them to listen, the user cannot get any message, while clicking them to listen one by one is a waste of time. In this case, key information of a first voice message in the plurality of voice messages is associated with the first voice message, and the associated message is displayed. The first voice message is any voice message in the plurality of voice messages. In other words, key information of each voice message in the plurality of voice messages is displayed, so that the user may listen to the voice message that he is interested in through the key information, thus improving the convenience of listening voice messages.

Optionally, the key information may be displayed with the target message in the form of annotation. The displaying the first target association message includes:

displaying the M keywords at a first target position in a form of text annotation, where the first target position is corresponding to a display position of the target message, and the M keywords are displayed in a target display mode corresponding to the scenario identifier of the target scenario.

Optionally, the displaying the first target association message includes:

generating a first annotation icon based on the association information, where the first annotation icon is used for linking to the target history message; and displaying the first annotation icon at a second target position, where the second target position is corresponding to a display position of the target message.

Optionally, the key information includes M keywords of the text content, where M is a positive integer, and the displaying the first target association message includes:

in a case that the M keywords of the text content include a target keyword, generating a second annotation icon based on the target keyword, where the second annotation icon is associated with a hyperlink corresponding to the target keyword, and the hyperlink is used for jumping to an interface corresponding to the target keyword; and displaying the second annotation icon at a third target position, where the third target position is corresponding to a display position of the target message.

In the foregoing implementation, after the keywords, the scenario, and the association information of the voice message are obtained, the key information may be displayed with the voice message on the chat interface in different annotation forms, so as to improve the content presentation effect of the voice message. The forms of annotation include, but are not limited to, text descriptions, background colors, icons, patterns, and various symbols with meanings.

Figure 2:
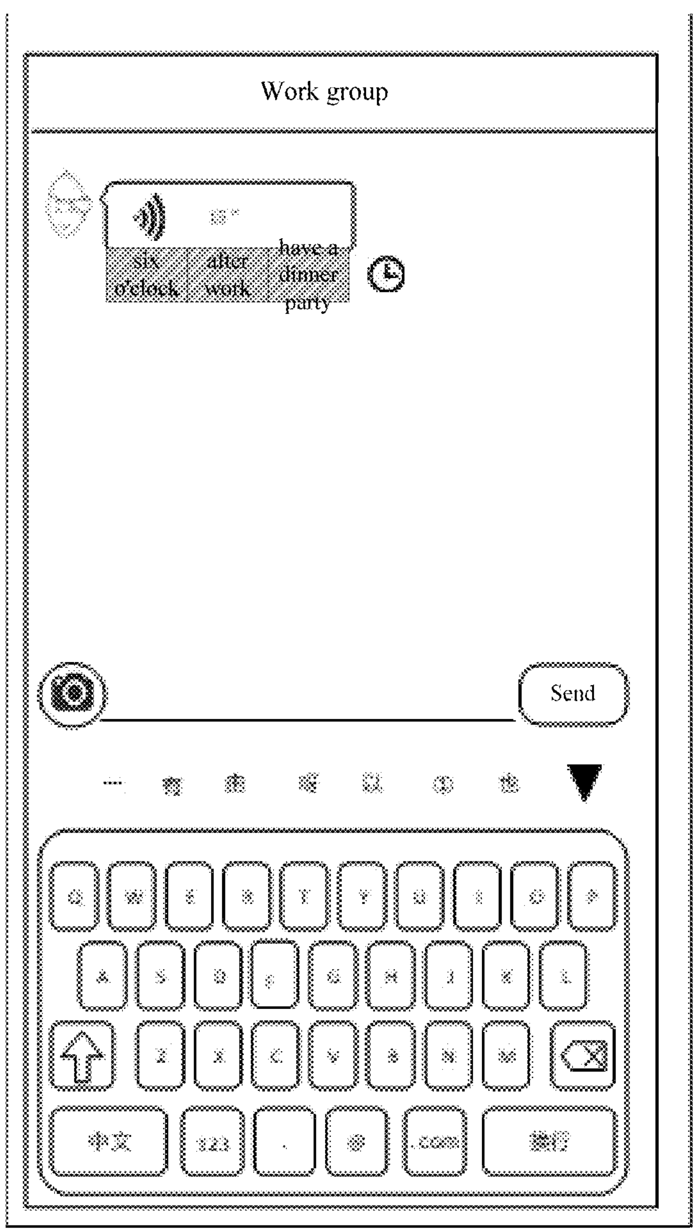
FIG. 2 is a first schematic diagram for displaying a first target association message.

Referring to FIG. 2, FIG. 2 is a first schematic diagram for displaying a first target association message. As shown in FIG. 2, a voice message is received in a work group, which is "Let's have a dinner party after work at six o'clock". In this case, the voice message may be converted to text to obtain text content, and the keywords "six o'clock", "after work", and "have a dinner party" are extracted from the text content. The keywords of the voice message are used to match vocabulary libraries under preset scenarios, and it is determined that the scenario to which the voice message belongs is the life scenario.

These keywords may be displayed at a first target position in a form of text annotation, and the first target position is corresponding to a display position of the target message, for example, the keywords are displayed below the target message. In addition, these keywords are displayed in a target display mode corresponding to the scenario identifier of the target scenario, for example, the target display mode is highlighting. In other words, the annotated text is highlighted correspondingly based on the target scenario, and highlighting means that the annotated text may be displayed with different backgrounds such as colors. For example, if the voice message belongs to the life scenario, it is usually a relaxing moment, and the background color may be displayed as green; if the voice message belongs to the work scenario, the message is of high importance, the background color may be displayed as yellow, and the color of the annotated text may be red; if the voice message belongs to the learning scenario, the background color may be displayed as blue; and if the voice message has no scenario, there may be no background color.

In addition, if there is a target keyword, such as time or place, in the M keywords of the voice message, a second annotation icon may be generated. The second annotation icon is displayed at a third target position, for example, displayed below the target message. For example, if the keyword includes time content, a time icon may be generated, and the time icon is associated with a hyperlink corresponding to the time. If the user clicks the time icon, it may jump to the alarm clock setting, which is convenient for the user to set a time reminder.

As shown in FIG. 2, the keywords of the first voice message in the work group are displayed below the voice message. Since the scenario to which the voice message belongs is the life scenario, the background color may be green, and since the keywords of the voice message include time content, a time icon may be displayed behind the annotated text. If the user clicks the time icon, it may jump to the alarm clock setting, which is convenient for the user to set a time reminder.

Optionally, a second voice message is received in the work group, and a time interval between the voice message and the first voice message is two minutes. The voice message is "Let's go to sing together later, and the place is near Maoye Department Store". In this case, the voice message may be converted to text to obtain text content, and the keywords “sing” and “Maoye Department Store” are extracted from the text content. The keywords of the voice message are used to match vocabulary libraries under preset scenarios, and it is determined that the scenario to which the voice message belongs is also the life scenario.

Based on keyword association analysis, it can be concluded that the voice message has associative extension with the keywords of the first voice message, and there is an association relationship between the voice message and the first voice message. In this case, a first annotation icon may be displayed below the voice message, the first annotation icon may be an icon of an association link, and the first annotation icon may be displayed at a second target position, for example, displayed below the target message. If the user clicks the icon, it can be linked to the first voice message.

Figure 3:
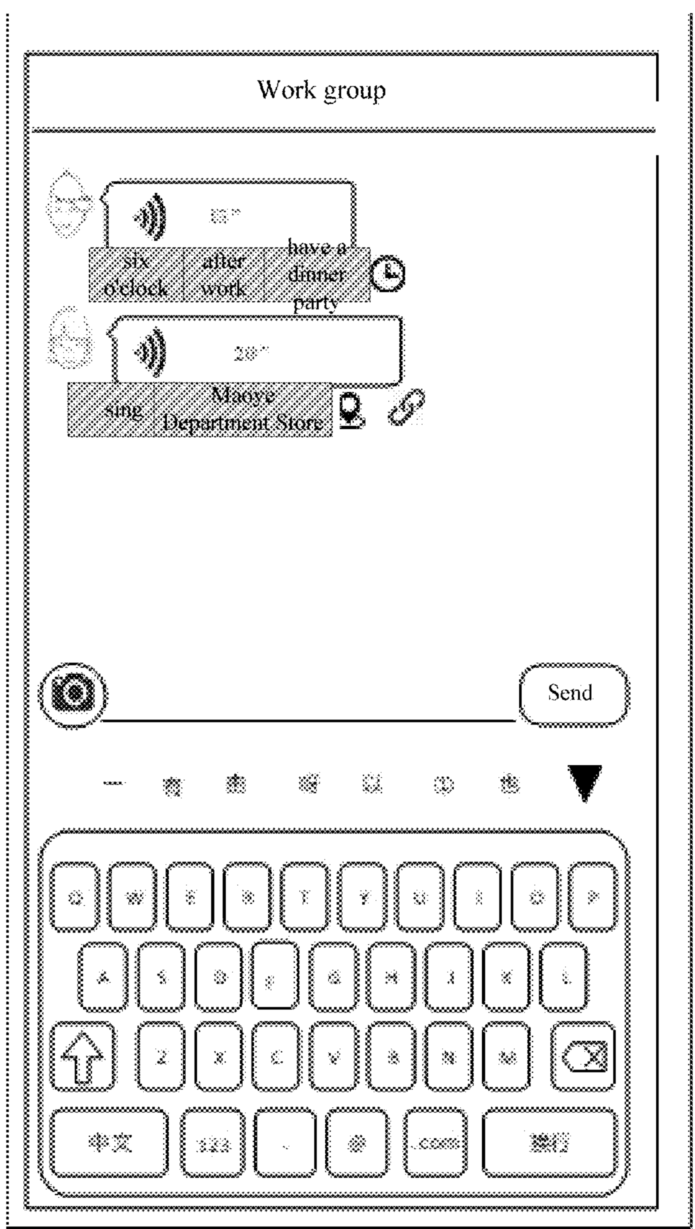
FIG. 3 is a second schematic diagram for displaying a first target association message.

Referring to FIG. 3, FIG. 3 is a second schematic diagram for displaying a first target association message. As shown in FIG. 3, the keywords of the voice message are displayed below the voice message, and since the scenario to which the voice message belongs is also the life scenario, the background color is also green. And since there is an association relationship between the voice message and the first voice message, an icon of the association link may be displayed behind the annotated text. If the user clicks the icon, it can jump to the first voice message, which is convenient for the user to listen to the related voice message. And since the keywords of the voice message include position content, a position icon may be displayed behind the annotated text. If the user clicks the position icon, it can jump to a map interface including the position, so as to facilitate navigation to the position.

Optionally, a third voice message is received in the work group, which is “Submit the project report before the end of work, which is related to the recent work performance and project evaluation”. In this case, the voice message may be converted to text to obtain text content, and the keywords “report”, “performance”, and “evaluation” are extracted from the text content. The keywords of the voice message are used to match vocabulary libraries under preset scenarios, and it is determined that the scenario to which the voice message belongs is also the work scenario. Since the scenario to which the voice message belongs is different from the scenarios to which the foregoing two voice messages belong, the voice message is a single voice message with no association relationship with the foregoing two voice messages.

Figure 4:
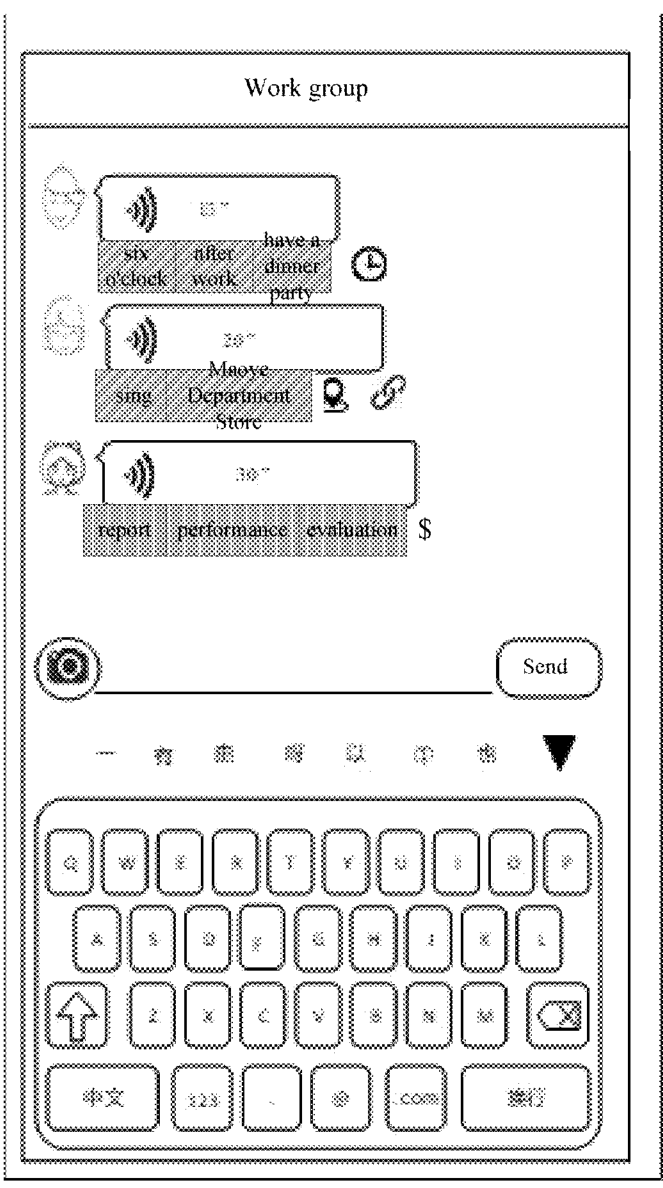
FIG. 4 is a third schematic diagram for displaying a first target association message.

Referring to FIG. 4, FIG. 4 is a third schematic diagram for displaying a first target association message. As shown in FIG. 4, the keywords of the voice message are displayed below the voice message, and since the scenario to which the voice message belongs is the work scenario, the background color may be yellow, and the annotated text may be displayed in bold (or in red font). In addition, a symbol of “$” may be displayed at the end of the annotated text to emphasize performance and evaluation.

In this embodiment, the key information is displayed with the voice message in different annotation forms, so as to highlight the key information of the voice message, and thus improve the content presentation effect of the voice message.

Optionally, before the associating the key information with the target message to obtain a first target association message, the method further includes:

detecting environmental information;

the associating the key information with the target message to obtain a first target association message includes:

in a case that the environment information indicates a first environment, associating the key information with the target message to obtain the first target association message; and the method further includes:

in a case that the environment information indicates a second environment, associating privacy protection information with the target message to obtain a second target association message, where the privacy protection information is encrypted information of the key information; and displaying the second target association message.

Different from Embodiment 1, in this embodiment, by analyzing the environment, when the environment indicates that privacy protection is not required, the key information is associated with the target message to obtain the first target association message, and the first target association message is displayed. And when the environment indicates that privacy protection is required, privacy protection is performed on the key information.

For example, a current environment of the terminal may be detected by using a camera of the terminal. If the detected environment information indicates the first environment, it is not necessary to enable a privacy protection function, and the key information is directly displayed with the target message. In this case, information displayed with the voice message is annotated as the key information. The first environment may be a preset environment, for example, a relatively private environment for the user such as the bedroom of the user or an environment for the user only.

In a case that the detected environment information indicates a second environment, the privacy protection function is enabled. The privacy protection information is associated with the target message to obtain a second target association message, and the second target association message is displayed. The second environment may also be a preset environment, for example, a relatively public environment for the user such as a subway environment, an environment in which the user cannot be detected, or an environment in which there are other people besides the user.

The privacy protection information is encrypted information of the key information, and the privacy protection information may be information unrelated to the key information. For example, if the keyword of the voice message is “have a dinner party”, the word unrelated to the keyword in the privacy protection information may be “go home”, or information generated through antisense change of the key information. For example, if the keyword of the voice message is “red”, the word unrelated to the keyword in the privacy protection information may be “black”.

In a word, the key information cannot be associated with the privacy protection information, so that the key information can be well protected. Accordingly, the text, icons, and symbols annotated on the voice message based on the privacy protection information are all unreal.

When the environment information indicates the second environment, in a prompt area of the keywords, the display mode of the keywords may be different from the display mode of the keywords in the first environment, for example, displaying the keywords in italics or covering the keywords with slashes to imply to the user that the current environment is the second environment, and current information associated with the voice message is unreal.

Figure 5:
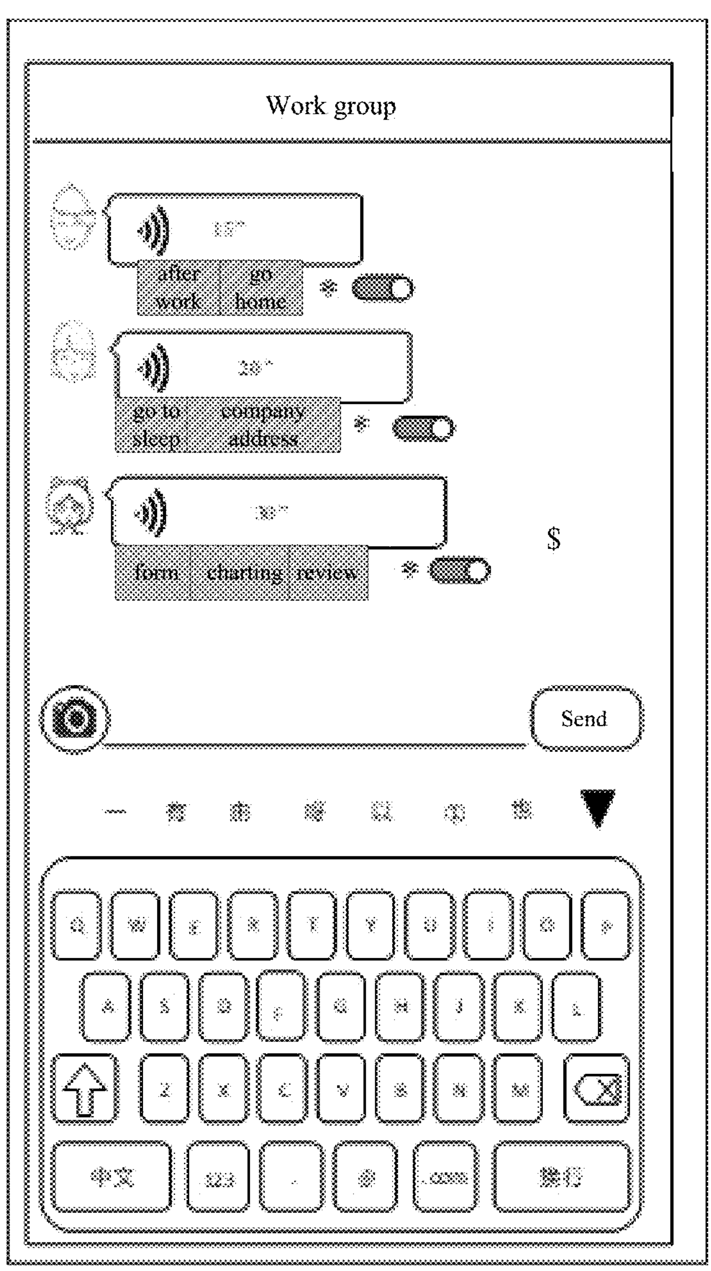
FIG. 5 is a schematic diagram for displaying a second target association message.

Referring to FIG. 5, FIG. 5 is a schematic diagram for displaying a second target association message. As shown in FIG. 5, for the voice message shown in FIG. 4, if the camera based on the terminal detects that there are other people besides the user in the current environment, key information of these voice messages may be kept private for protection, the privacy protection information is associated with these voice messages to obtain the second target association message, and the second target association message is displayed to avoid important information leakage.

For example, the important prompt symbols or icons, such as the time icon in the first voice message, the position icon and the icon of the association link in the second voice message, and the symbol of "$" in the third voice message, may all be replaced with the symbol of "*". In addition, the information highlighting may also be replaced. For example, if the keywords of the third voice message were originally highlighted with yellow background and red font, the striking yellow background may be set to gray background, and the red font may be replaced with black font to erase all important hints and enable others to ignore the voice message.

Finally, an additional switch icon may be added at the end of each voice message. In a case of clicking the switch icon, and when the password or fingerprint verification is successful, the privacy protection is canceled, and the key information is displayed with the voice message.

In this embodiment, in the environment in which privacy protection is required, the key information may be encrypted to generate privacy protection information, and the privacy protection information unrelated to or antisense to the key information may be displayed under the voice message. Only when the user uses the key information or the user confirms displaying the key information by himself, the key information will be displayed, which can effectively prevent information leakage.

It should be noted that, the message display method provided in this embodiment of this application may be performed by a message display apparatus or a control module that is in the message display apparatus and that is configured to perform the message display method. In this embodiment of this application, the message display apparatus provided in the embodiments of this application is described by using an example in which the message display method is performed by the message display apparatus.

Figures 6, 7:
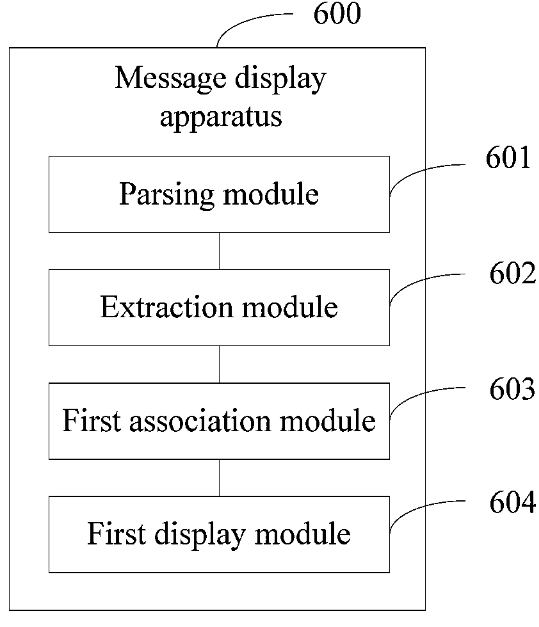
FIG. 6 is a structural diagram of a message display apparatus according to an embodiment of this application.
FIG. 7 is a structural diagram of an electronic device according to an embodiment of this application.

Referring to FIG. 6, FIG. 6 is a structural diagram of a message display apparatus according to an embodiment of this application. As shown in FIG. 6, the message display apparatus 600 includes:

a parsing module 601, configured to: in a case of receiving a target message, parse the target message to obtain text content of the target message;

an extraction module 602, configured to extract key information of the target message based on the text content;

a first association module 603, configured to associate the key information with the target message to obtain a first target association message; and a first display module 604, configured to display the first target association message.

Optionally, the extraction module 602 includes:

an extraction unit, configured to extract M keywords from the text content, where M is a positive integer;

a matching unit, configured to match the M keywords with vocabulary libraries under a plurality of preset scenarios, where each keyword has a matching relationship with a vocabulary library under at most one of the preset scenarios; and a determining unit, configured to: in a case of being matched successfully, determine a target scenario to which the target message belongs from at least one successfully matched preset scenario, where the key information includes the M keywords and a scenario identifier of the target scenario.

Optionally, the first display module 604 includes:

a first display unit, configured to display the M keywords at a first target position in a form of text annotation, where the first target position is corresponding to a display position of the target message, and the M keywords are displayed in a target display mode corresponding to the scenario identifier of the target scenario.

Optionally, the extraction module 602 includes:

a judging unit, configured to: if there is a target history message in a preset time period before the target message, determine whether there is an association relationship between the target message and the target history message, where a scenario to which the target history message belongs is the same as the target scenario; and an association unit, configured to: if there is an association relationship between the target message and the target history message, associate the target message with the target history message to obtain association information of the target message, where the association information is used to link the target message to the target history message, and the key information includes the association information.

Optionally, the first display module 604 includes:

a first generating unit, configured to generate a first annotation icon based on the association information, where the first annotation icon is used for linking to the target history message; and a second display unit, configured to display the first annotation icon at a second target position, where the second target position is corresponding to a display position of the target message.

Optionally, the key information includes M keywords of the text content, where M is a positive integer, and the first display module 604 includes:

a second generating unit, configured to: in a case that the M keywords of the text content include a target keyword, generate a second annotation icon based on the target keyword, where the second annotation icon is associated with a hyperlink corresponding to the target keyword, and the hyperlink is used for jumping to an interface corresponding to the target keyword; and a third display unit, configured to display the second annotation icon at a third target position, where the third target position is corresponding to a display position of the target message.

Optionally, the apparatus further includes:

a detecting module, configured to detect environmental information;

the first association module 603 is configured to: in a case that the environment information indicates a first environment, associate the key information with the target message to obtain the first target association message; and the apparatus further includes:

a second association module, configured to: in a case that the environment information indicates a second environment, associate privacy protection information with the target message to obtain a second target association message, where the privacy protection information is encrypted information of the key information; and a second display module, configured to display the second target association message.

In this embodiment, in a case of receiving a target message, the parsing module 601 parses the target message to obtain text content of the target message; the extraction module 602 extracts key information of the target message based on the text content; the first association module 603 associates the key information with the target message to obtain a first target association message; and the first display module 604 displays the first target association message. In this way, when the target message is displayed, the key information of the target message may be displayed with the target message, so that the key information in the target message may be obtained by the user without any operation to the target message. In this way, the content presentation effect of the target message can be improved.

The message display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in the embodiments of this application.

The message display apparatus in this embodiment of this application may be an apparatus with an operating system. The operating system may be an Android operating system, an iOS operating system, or another possible operating system, which is not limited in the embodiments of this application.

The message display apparatus provided in this embodiment of this application can implement processes implemented in the method embodiment of FIG. 1. To avoid repetition, details are not described herein again.

Optionally, referring to FIG. 7, FIG. 7 is a structural diagram of an electronic device according to an embodiment of this application. As shown in FIG. 7, an embodiment of this application further provides an electronic device 700, including a processor 701, a memory 702, and a program or an instruction stored in the memory 702 and executable on the processor 701. When the program or the instruction is executed by the processor 701, the processes of the foregoing message display method embodiment are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 8:
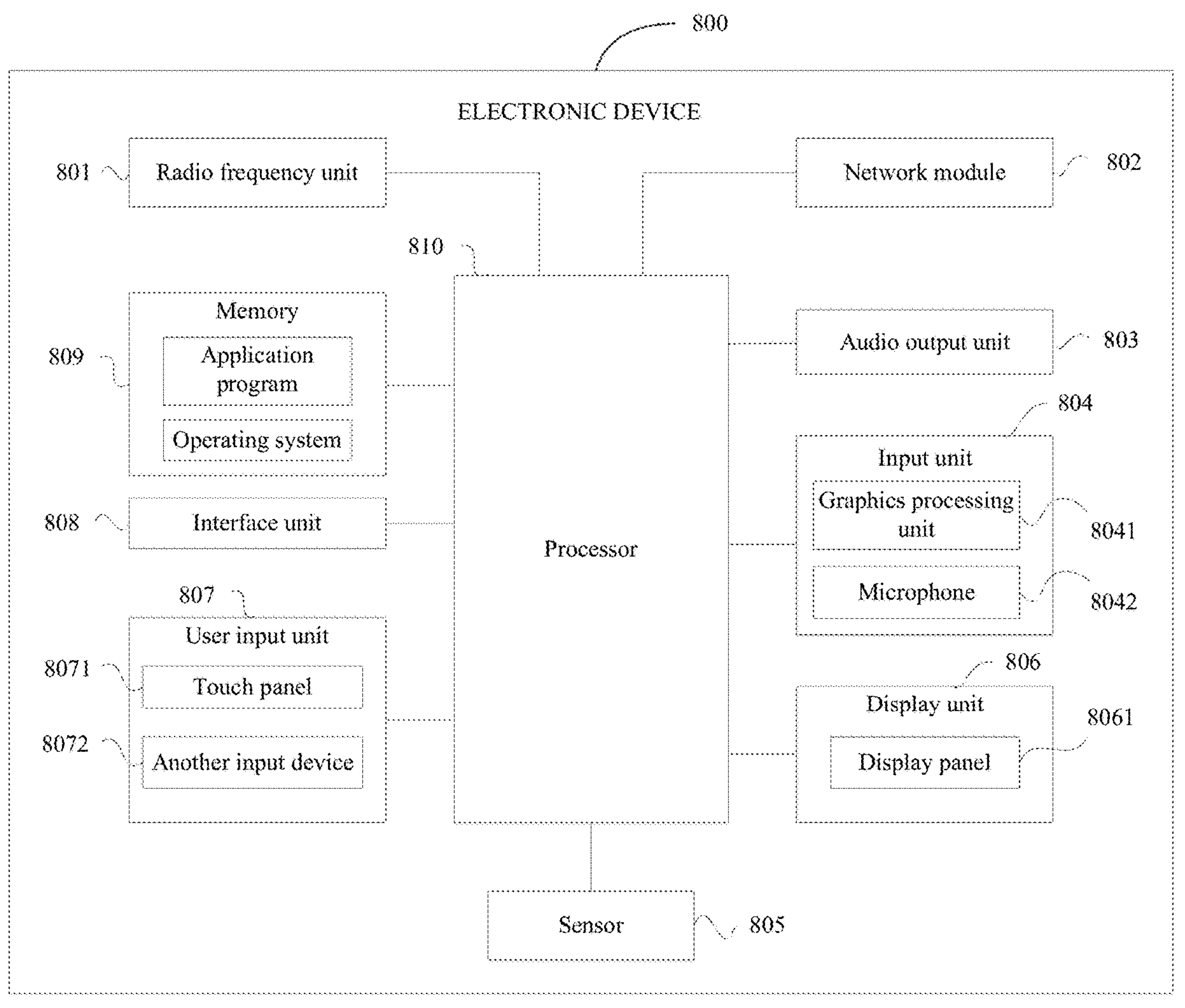
FIG. 8 is a schematic diagram of a hardware structure of an electronic device according to an embodiment of this application.

FIG. 8 is a schematic diagram of a hardware structure of an electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the electronic device 800 may further include a power supply (for example, a battery) that supplies power to the components. The power supply may be logically connected to the processor 810 by using a power management system, so as to implement functions such as charging management, discharging management, and power consumption management by using the power management system. The electronic device is not limited to the electronic device structure shown in FIG. 8. The electronic device may include more or fewer components than those shown in the figure, or combine some of the components, or arrange the components differently. Details are not described herein.

The processor 810 is configured to: in a case of receiving a target message, parse the target message to obtain text content of the target message; extract key information of the target message based on the text content; and associate the key information with the target message to obtain a first target association message; and the display unit 806 is configured to display the first target association message.

In the embodiments of this application, in a case of receiving a target message, the processor 810 parses the target message to obtain text content of the target message; extracts key information of the target message based on the text content; and associates the key information with the target message to obtain a first target association message; and the display unit 806 displays the first target association message. In this way, when the target message is displayed, the key information of the target message may be displayed with the target message, so that the key information in the target message may be obtained by the user without any operation to the target message. In this way, the content presentation effect of the target message can be improved.

Optionally, the processor 810 is further configured to: extract M keywords from the text content, where M is a positive integer; match the M keywords with vocabulary libraries under a plurality of preset scenarios, where each keyword has a matching relationship with a vocabulary library under at most one of the preset scenarios; and in a case of being matched successfully, determine a target scenario to which the target message belongs from at least one successfully matched preset scenario, where the key information includes the M keywords and a scenario identifier of the target scenario.

Optionally, the display unit 806 is further configured to display the M keywords at a first target position in a form of text annotation, where the first target position is corresponding to a display position of the target message, and the M keywords are displayed in a target display mode corresponding to the scenario identifier of the target scenario.

Optionally, the processor 810 is further configured to: if there is a target history message in a preset time period before the target message, determine whether there is an association relationship between the target message and the target history message, where a scenario to which the target history message belongs is the same as the target scenario; and if there is an association relationship between the target message and the target history message, associate the target message with the target history message to obtain association information of the target message, where the association information is used to link the target message to the target history message, and the key information includes the association information.

Optionally, the display unit 806 is further configured to generate a first annotation icon based on the association information, where the first annotation icon is used for linking to the target history message; and display the first annotation icon at a second target position, where the second target position is corresponding to a display position of the target message.

Optionally, the key information includes M keywords of the text content, where M is a positive integer, the display unit 806 is further configured to: in a case that the M keywords of the text content include a target keyword, generate a second annotation icon based on the target keyword, where the second annotation icon is associated with a hyperlink corresponding to the target keyword, and the hyperlink is used for jumping to an interface corresponding to the target keyword; and display the second annotation icon at a third target position, where the third target position is corresponding to a display position of the target message.

Optionally, the processor 810 is further configured to detect environmental information;

the processor 810 is configured to: in a case that the environment information indicates a first environment, associate the key information with the target message to obtain the first target association message;

the processor 810 is further configured to: in a case that the environment information indicates a second environment, associate privacy protection information with the target message to obtain a second target association message, where the privacy protection information is encrypted information of the key information; and the display unit 806 is further configured to display the second target association message.

It should be understood that, in this embodiment of this application, the input unit 804 may include a graphics processing unit (GPU) 8041 and a microphone 8042. The graphics processing unit 8041 processes image data of a static picture or a video obtained by an image capture apparatus (such as a camera) in a video capture mode or an image capture mode. The display unit 806 may include a display panel 8061, and the display panel 8061 may be configured in a form of a liquid crystal display, an organic light-emitting diode, or the like. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein. The memory 809 may be configured to store a software program and various data, including but not limited to an application program and an operating system. The processor 810 may be integrated with an application processor and a modem processor. The application processor mainly processes an operating system, a user interface, an application program, and the like, and the modem processor mainly processes wireless communication. It can be understood that, alternatively, the modem processor may not be integrated into the processor 810.

An embodiment of this application further provides a non-transitory computer-readable storage medium, where the non-transitory computer-readable storage medium stores a program or an instruction, and when the program or the instruction is executed by a processor, the processes of the foregoing message display method embodiment are implemented, and a same technical effect can be achieved. To avoid repetition, details are not described herein again.

The processor is a processor in the electronic device in the foregoing embodiment. The non-transitory computer-readable storage medium includes a read-only memory (ROM), a random access memory (RAM), a magnetic disk, an optical disc, or the like.

An embodiment of this application also provides a chip, where the chip includes a processor and a communications interface, and the communications interface is coupled to the processor. The processor is configured to execute a program or an instruction to implement the processes of the foregoing message display method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It can be understood that the embodiments described in the present disclosure may be implemented by hardware, software, firmware, middleware, microcode, or a combination thereof. For implementation with hardware, the module, unit, submodule, and subunit may be implemented in one or more application specific integrated circuits (ASIC), a digital signal processor (DSP), a digital signal processing device (DSPD), a programmable logic device (PLD), a field-programmable gate array (FPGA), general processors, controllers, micro-controllers, micro-processors, and other electronic units for implementing the functions of this application, or their combinations.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A message display method, performed by an electronic device, wherein the electronic device comprises a processor and a display unit, and the method comprises:

in a case of receiving a target message, parsing, by the processor, the target message to obtain text content of the target message;

extracting, by the processor, key information of the target message based on the text content;

associating, by the processor, the key information with the target message to obtain a first target association message; and displaying, by the display unit, the first target association message;

wherein the extracting key information of the target message based on the text content comprises:

extracting, by the processor, M keywords from the text content, wherein M is a positive integer;

matching, by the processor, the M keywords with vocabulary libraries under a plurality of preset scenarios, wherein each keyword has a matching relationship with a vocabulary library under at most one of the preset scenarios; and in a case of being matched successfully, determining, by the processor, a target scenario to which the target message belongs from at least one successfully matched preset scenario; wherein the key information comprises the M keywords and a scenario identifier of the target scenario; and in a case that the M keywords of the text content comprise a target keyword, displaying, by the display unit, a second annotation icon at a third target position; wherein the second annotation icon is generated based on the target keyword, the target keyword is a place keyword or a time keyword; the second annotation icon is associated with a hyperlink corresponding to the target keyword, the hyperlink is used for jumping to an interface corresponding to the target keyword, an interface corresponding to the place keyword is used to navigate to the position corresponding to the place keyword, an interface corresponding to the time key word is used to set an alarm clock, and M is a positive integer; wherein the third target position is corresponding to a display position of the target message; wherein the extracting, by the processor, key information of the target message based on the text content further comprises:

if there is a target history message in a preset time period before the target message, determining, by the processor, whether there is an association relationship between the target message and the target history message, wherein a scenario to which the target history message belongs is same as the target scenario; and if there is an association relationship between the target message and the target history message, associating, by the processor, the target message with the target history message to obtain association information of the target message, wherein the association information is used to link the target message to the target history message, and the key information comprises the association information.

2. The method according to claim 1, wherein the displaying the first target association message comprises:

displaying, by the display unit, the M keywords at a first target position in a form of text annotation; wherein the first target position is corresponding to a display position of the target message, and the M keywords are displayed in a target display mode corresponding to the scenario identifier of the target scenario.

3. The method according to claim 1, wherein the displaying the first target association message comprises:

generating, by the display unit, a first annotation icon based on the association information, wherein the first annotation icon is used for linking to the target history message; and displaying, by the display unit, the first annotation icon at a second target position, wherein the second target position is corresponding to a display position of the target message.

4. The method according to claim 1, wherein before the associating, by the processor, the key information with the target message to obtain a first target association message, the method further comprises:

detecting, by the processor, environmental information;

the associating, by the processor, the key information with the target message to obtain a first target association message comprises:

in a case that the environment information indicates a first environment, associating, by the processor, the key information with the target message to obtain the first target association message; and the method further comprises:

in a case that the environment information indicates a second environment, associating, by the processor, privacy protection information with the target message to obtain a second target association message, wherein the privacy protection information is encrypted information of the key information; and displaying, by the display unit, the second target association message.

5. An electronic device, comprising a processor, a display unit, a memory, and a program or an instruction stored in the memory and executable on the processor, wherein the program or the instruction, when executed by the processor:

the processor is configured to: in a case of receiving a target message, parsing the target message to obtain text content of the target message;

extract key information of the target message based on the text content; and associate the key information with the target message to obtain a first target association message; and the display unit is configured to display the first target association message;

wherein the processor is further configured to:

extract M keywords from the text content, wherein M is a positive integer;

match the M keywords with vocabulary libraries under a plurality of preset scenarios, wherein each keyword has a matching relationship with a vocabulary library under at most one of the preset scenarios; and in a case of being matched successfully, determine a target scenario to which the target message belongs from at least one successfully matched preset scenario;

wherein the key information comprises the M keywords and a scenario identifier of the target scenario; and the display unit is further configured to: in a case that the M keywords of the text content comprise a target keyword, display a second annotation icon at a third target position; wherein the second annotation icon is generated based on the target keyword, the target keyword is a place keyword or a time keyword; the second annotation icon is associated with a hyperlink corresponding to the target keyword, the hyperlink is used for jumping to an interface corresponding to the target keyword, an interface corresponding to the place keyword is used to navigate to the position corresponding to the place keyword, an interface corresponding to the time key word is used to set an alarm clock, and M is a positive integer; wherein the third target position is corresponding to a display position of the target message; wherein the processor is further configured to:

if there is a target history message in a preset time period before the target message, determine whether there is an association relationship between the target message and the target history message, wherein a scenario to which the target history message belongs is same as the target scenario; and if there is an association relationship between the target message and the target history message, associate the target message with the target history message to obtain association information of the target message, wherein the association information is used to link the target message to the target history message, and the key information comprises the association information.

6. The electronic device according to claim 5, wherein the program or the instruction, when executed by the processor, the display unit is further configured to:

display the M keywords at a first target position in a form of text annotation; wherein the first target position is corresponding to a display position of the target message, and the M keywords are displayed in a target display mode corresponding to the scenario identifier of the target scenario.

7. The electronic device according to claim 5, wherein the program or the instruction, when executed by the processor, the display unit is further configured to:

generate a first annotation icon based on the association information, wherein the first annotation icon is used for linking to the target history message; and display the first annotation icon at a second target position, wherein the second target position is corresponding to a display position of the target message.

8. The electronic device according to claim 5, wherein the program or the instruction, when executed by the processor the processor is further configured to:

detect environmental information;

in a case that the environment information indicates a first environment, associate the key information with the target message to obtain the first target association message; and in a case that the environment information indicates a second environment, associate privacy protection information with the target message to obtain a second target association message, wherein the privacy protection information is encrypted information of the key information; and the display unit is further configured to display the second target association message.

9. A non-transitory computer-readable storage medium, wherein the non-transitory computer-readable storage medium stores a program or an instruction, and the program or the instruction, when executed by a processor of an electronic device:

the processor is configured to: in a case of receiving a target message, parsing the target message to obtain text content of the target message;

extract key information of the target message based on the text content; and associate the key information with the target message to obtain a first target association message; and a display unit of the electronic is configured to display the first target association message;

wherein the processor is further configured to:

extract M keywords from the text content, wherein M is a positive integer;

match the M keywords with vocabulary libraries under a plurality of preset scenarios, wherein each keyword has a matching relationship with a vocabulary library under at most one of the preset scenarios; and in a case of being matched successfully, determine a target scenario to which the target message belongs from at least one successfully matched preset scenario;

wherein the key information comprises the M keywords and a scenario identifier of the target scenario; and the display unit is further configured to: in a case that the M keywords of the text content comprise a target keyword, display a second annotation icon at a third target position; wherein the second annotation icon is generated based on the target keyword, the target keyword is a place keyword or a time keyword; the second annotation icon is associated with a hyperlink corresponding to the target keyword, the hyperlink is used for jumping to an interface corresponding to the target keyword, an interface corresponding to the place keyword is used to navigate to the position corresponding to the place keyword, an interface corresponding to the time key word is used to set an alarm clock, and M is a positive integer; wherein the third target position is corresponding to a display position of the target message; wherein the processor is further configured to:

if there is a target history message in a preset time period before the target message, determine whether there is an association relationship between the target message and the target history message, wherein a scenario to which the target history message belongs is same as the target scenario; and if there is an association relationship between the target message and the target history message, associate the target message with the target history message to obtain association information of the target message, wherein the association information is used to link the target message to the target history message, and the key information comprises the association information.

10. The non-transitory computer-readable storage medium according to claim 9, wherein the program or the instruction, when executed by the processor:

the display unit is further configured to:

display the M keywords at a first target position in a form of text annotation; wherein the first target position is corresponding to a display position of the target message, and the M keywords are displayed in a target display mode corresponding to the scenario identifier of the target scenario.

11. The non-transitory computer-readable storage medium according to claim 9, wherein the program or the instruction, when executed by the processor, the display unit is further configured to:

generate a first annotation icon based on the association information, wherein the first annotation icon is used for linking to the target history message; and display the first annotation icon at a second target position, wherein the second target position is corresponding to a display position of the target message.

12. The non-transitory computer-readable storage medium according to claim 9, wherein the program or the instruction, when executed by the processor, the processor is further configured to:

detect environmental information;

in a case that the environment information indicates a first environment, associate the key information with the target message to obtain the first target association message; and in a case that the environment information indicates a second environment, associate privacy protection information with the target message to obtain a second target association message, wherein the privacy protection information is encrypted information of the key information; and the display unit is further configured to display the second target association message.

* * * * *